United States Patent [19]

Beers

[11] Patent Number: 5,091,467
[45] Date of Patent: Feb. 25, 1992

[54] CONTROLLED MORPHOLOGY BARRIER ELASTOMERS MADE FROM BLENDS OF SYNDIOTACTIC 1,2-POLYBUTADIENE AND ETHYLENE-VINYL ACETATE-VINYL ALCOHOL TERPOLYMERS

[75] Inventor: Roger N. Beers, Uniontown, Ohio

[73] Assignee: The Goodyear Tire & Rubber Company, Akron, Ohio

[21] Appl. No.: 678,879

[22] Filed: Mar. 29, 1991

[51] Int. Cl.$^5$ .............. B60C 9/14; B32B 27/28; C08L 23/26; C08L 9/00
[52] U.S. Cl. ..................... 525/57; 152/203; 152/510; 152/DIG. 16
[58] Field of Search .......... 525/57; 152/510, DIG. 16

[56] References Cited

U.S. PATENT DOCUMENTS

| | | | |
|---|---|---|---|
| 3,595,740 | 7/1971 | Gerow | 525/60 |
| 4,281,045 | 7/1981 | Sumi et al. | 428/516 |
| 4,362,844 | 12/1982 | Lemstra et al. | 432/13 |
| 4,394,473 | 7/1983 | Winter et al. | 524/226 |
| 4,905,735 | 3/1990 | Akiyoshi | 428/36.1 |
| 4,956,210 | 9/1990 | Hoyt et al. | 428/412 |

FOREIGN PATENT DOCUMENTS

| | | |
|---|---|---|
| 193823 | 9/1986 | European Pat. Off. |
| 337279 | 10/1988 | European Pat. Off. |
| 2341782 | 12/1982 | Fed. Rep. of Germany |
| 54-057582 | 5/1975 | Japan |
| 52-141854 | 11/1977 | Japan |
| 53-075278 | 7/1978 | Japan |
| 54-016582 | 2/1979 | Japan |
| 54-046281 | 4/1979 | Japan |
| 54-050084 | 4/1979 | Japan |
| 54-153854 | 12/1979 | Japan |
| 57185341 | 1/1980 | Japan |
| 56-123862 | 9/1981 | Japan |
| 57-028157 | 2/1982 | Japan |
| 55-149341 | 11/1982 | Japan |
| 58-056822 | 4/1983 | Japan |
| 58-084836 | 5/1983 | Japan |
| 58-148761 | 9/1983 | Japan |
| 5057747 | 4/1984 | Japan |
| 59-089383 | 5/1984 | Japan |
| 59-157134 | 9/1984 | Japan |
| 59-224343 | 12/1984 | Japan |
| 61-108653 | 5/1986 | Japan |
| 61-242841 | 10/1986 | Japan |
| 62-158042 | 7/1987 | Japan |
| 63-037132 | 2/1988 | Japan |
| 1-152061 | 6/1989 | Japan |
| 1-301244 | 12/1989 | Japan |
| 1-308452 | 12/1989 | Japan |
| 1-313552 | 12/1989 | Japan |

*Primary Examiner*—Carman J. Seccuro
*Attorney, Agent, or Firm*—Henry C. Young, Jr.

[57] ABSTRACT

An elastomer barrier composition comprises a melt blend of syndiotactic 1,2-polybutadiene, a terpolymer of ethylene, vinyl acetate and vinyl alcohol, and a compatibilizing agent. The melt blend is formed under suitable mixing and shear conditions such that the terpolymer exists as a separate domain in generally a flat or plate-like form. The elastomer barrier material can be utilized in rubber compositions such as in the innerliner of the tire.

10 Claims, No Drawings

CONTROLLED MORPHOLOGY BARRIER ELASTOMERS MADE FROM BLENDS OF SYNDIOTACTIC 1,2-POLYBUTADIENE AND ETHYLENE-VINYL ACETATE-VINYL ALCOHOL TERPOLYMERS

FIELD OF THE INVENTION

The present invention relates to a barrier-resistant elastomer having controlled morphology in that a terpolymer of ethylene, vinyl acetate, and vinyl alcohol exists as a separate, generally flat or plate-like domain when blended with syndiotactic 1,2-polybutadiene and a compatibilizing agent.

BACKGROUND

Heretofore, in the field of tires, it is known to use a halobutyl rubber to provide barrier resistance to a gas as in the innerliner portion of a tire.

U.S. Pat. No. 4,281,045 discloses multilayered extrusion molding of excellent gas barrier property. The layer is formed of saponified EVA and PVA and an adjacent layer of polyolefin.

U.S. Pat. No. 4,362,844, to Lemstra, discloses biaxially stretched mixtures of crystalline polypropylene and ethylene vinyl alcohol copolymer having good optical properties and low gas permeability.

U.S. Pat. No. 4,394,473 to Winter, discloses syndiotactic 1,2-polybutadiene bags of films for packaging useful for unvulcanized rubber components having good compatibility and dispersibility in rubber compounds.

U.S Pat. No. 4,905,735 assigned to Tokai Rubber, discloses a rubber hose for transportation of cooling medium comprising outer rubber layer, fiber-reinforced middle layer, and inner rubber layer comprising inner and outer rubber layers and an intermediate resin layer.

European Patent 193,823 discloses a co-extruded two-layer bag of syndiotactic 1,2-polybutadiene for packaging vulcanized or unvulcanized rubber or compounding ingredients.

European Patent 337,279 to Ling discloses improved gas barrier structure for pneumatic articles. The gas barrier structure comprises a gas barrier film laminated between and bonded to two vulcanizable elastomeric surface layers and is a non-elastomeric polymeric layer.

German Patent 2,341,782 discloses a polyolefin/ethylene vinyl acetate film laminate having high resistance to delamination and permeation by gasses.

Japanese Patent 1152061 to Tokai discloses a hose for transportation of cooling medium comprising inner and outer tube layers, with intermediate fiber-reinforcing layer.

Japanese Patent 1301244 assigned to Tokai Rubber, discloses a hose for transporting cooling medium comprising an elastic layer of nylon and saponified EVA copolymer.

Japanese Patent 1308452 discloses a gas-impermeable resin composition containing nylon and saponified product of EVA copolymer. This material is used as coolant feeding hoses, as packaging and containers for food.

Japanese Patent 1313552 discloses a material comprising 5 to 70 weight percent of polyolefinic thermoplastic resin, 30 to 90 weight percent olefin/vinyl alcohol resin, 2 to 20 weight percent modified copolymer consisting of a vinyl aromatic polymer block and conjugated diene polymer block. This patent discloses the use as a layer of a multilayered food packaging material.

Japanese Patent 5057747 discloses a heat-moldable laminated resin sheet comprising crystalline polymer sheet, saponified EVA or a polyamide sheet, and non-crystalline polymer sheet laminated with adhesive resin.

Japanese Patent 52141854 discloses a resin molding composition comprising solvent-soluble rubbery compound and olefin.

Japanese Patent 53075278 discloses a transparent, heat-shrinkable polyolefin film produced by a blend of high and low melting resins as a tube or sheet, and irradiating the product.

Japanese Patent 54016582 discloses a laminated film comprising polyvinylidene chloride saponified polyamide resin or EVA copolymer, and heat-resistant adhesive resin and polyolefin resin.

Japanese Patent 54046281 discloses polymer laminates produced by extruding a blend comprising styrene-based polymer, gas barrier resin and tacky resin.

Japanese Patent 54050084 discloses bonding a laminate of polypropylene layer and EVA copolymer using methylmethacrylate-butadiene-styrene terpolymer and styrene-butadiene block copolymer adhesive.

Japanese Patent 54057582 discloses a resin laminate with good gas barrier property comprising EVA copolymer, resin layer containing diene block copolymer and olefin copolymer, and a polystyrene layer.

Japanese Patent 54153854 discloses weather-proof polymer compositions having good adhesion properties comprising weatherproof polymer and polymers containing no unsaturation in the main chain, but containing unsaturated side chains and treated with halogen.

Japanese Patent 55149341 discloses a thermoplastic resin composition used in laminate products prepared from unsaturated carboxylic acid-modified polyolefin, hydroxy group containing polymer and rubber.

Japanese Patent 56123862 discloses a heat adhesive resin film for manufacturing bags by coating aqueous dispersions of ethylene vinyl alcohol and PVA on resin film and drying.

Japanese Patent 57028157 discloses a flame-retardant composition based on non-halogenated polymer containing organopolysiloxane and organo-metallic compounds.

Japanese Patent 57185341 discloses polybutadiene resin composition prepared by blending syndiotactic 1,2-polybutadiene resin with dibenzylidene alditols or mono(di)(alkyl) phenyl phosphate.

Japanese Patent 58056822 discloses a primer sheet for lining polyethylene sheet or steel pipe comprising thermosetting resin and thermoplastic resin with higher melt viscosity.

Japanese Patent 58084836 discloses an agricultural film composition of high fog resistance, transparency, comprising a base polymer of low density polyethylene and EVA, PVA or olefin PVA copolymer.

Japanese Patent 58148761 discloses a gas barrier resin laminated with two resin layers with an adhesive resin layer.

Japanese Patent 59089383 to Motomura discloses a water-swellable packing material comprising rubber, water-soluble polymer, and hydrogel.

Japanese Patent 59157134 discloses a non-flammable composition for coating electric cables containing EVA or ethylene-ethyl acrylic copolymer, polybutadiene flame retardant, and antimony trioxide, zinc oxide and magnesium silicate.

Japanese Patent 59224343 discloses a laminated structure for wrapping foods comprising saponified EVA copolymer layer and olefin polymer layer in solid rubber.

Japanese Patent 6005237 to Toyobo discloses a laminated polyester film for molding containers for food, comprising polyethylene terephthalate film, said polymer laminated to surface and sparingly gas permeable material.

Japanese Patent 61108653 discloses a polybutadiene composition prepared by mixing crystalline syndiotactic 1,2-polybutadiene with an aqueous dispersion and/or organic solution of elastic polymer.

Japanese Patent 61242841 discloses a laminated oil-resistant vessel for foods, having saponified EVA layer and thermoplastic resin layer.

Japanese Patent 62158042 discloses a readily heat-sealable plastic film having charge-controlling coating containing carbon black and an acrylic resin layer containing urethane prepolymer.

Japanese Patent 63037132 discloses a flexible film which can be readily incinerated containing thermoplastic polybutadiene, polyolefin, and inorganic filler, low density linear polyethylene diaper.

SUMMARY OF THE INVENTION

The present invention relates to a blend of syndiotactic 1,2-polybutadiene, a terpolymer, and a compatibilizing agent, which blend serves as an effective barrier with regard to a gas such as air. The terpolymer is made from monomers of ethylene, vinyl acetate, and vinyl alcohol. The blend is prepared by melt mixing the components with controlled morphology wherein adequate shear and/or mixing is utilized such that the terpolymer generally exists in a flat, platelike, or elongated form. Unexpectedly low permeation is obtained due to the morphology configuration of the terpolymer within the blend.

DETAILED DESCRIPTION

Syndiotactic 1,2-polybutadiene (i.e., a polybutadiene containing high amounts of syndiotactic 1,2-structure) is commercially available and is also known to those skilled in the art as well as to the literature. Generally, this compound is formed by solution polymerization utilizing organic lithium catalyst or coordination catalysts. These catalysts are usually charged under an inert atmosphere of nitrogen or argon before use. Solvents that may be used during the polymerization reaction include aromatic, aliphatic, and alicyclic hydrocarbons. Three possible structures may be formed in the polymerization of butadiene. These structures include an isotactic configuration in which all the monomer units add in the same configuration; an atactic configuration in which the disposition of the units is random; and a syndiotactic structure in which the units are in an alternating configuration. Syndiotactic 1,2-polybutadiene (syn 1,2-PBD) is distinguished from other polybutadienes in that there is participation of only one double bond in the polymerization process. The amount of the actual syndiotactic structure of the so-called syndiotactic 1,2-polybutadiene is generally at least 80 percent, desirably at least 85 percent, and preferably at least 90 percent by weight based on the total weight of the three possible microstructures. The vinyl content of the syndiotactic polybutadiene can vary from about 82 to 96 percent, desirably from about 82 to 92, and preferably from about 82 to 90.

Syndiotactic 1,2-polybutadiene tends to be rigid, crystalline, and has poor solubility characteristics. The Tg of syn 1,2-PBD will vary depending on the vinyl content and specifically at about 83 percent vinyl content the Tg is about −15° C. The melting point of syn 1,2-PBD varies with the microstructure and the amount of vinyl groups. Typical values range from approximately 120° C. at about 80 percent vinyl to approximately 210° C. at about 100 percent vinyl content.

The amount of the syndiotactic 1,2-microstructure containing polybutadiene is the weight percent difference of the compatibilizing agent and the terpolymer, both of which are discussed herein below.

The barrier terpolymer is a thermoplastic resin having very low gas permeability. The thermoplastic polymer is commercially available and is known to those skilled in the art as well as to the literature. It is made from monomers of ethylene and [saponified] vinyl acetate, wherein the amount of ethylene (that is, repeat units derived therefrom) in the terpolymer is generally less than about 50 weight percent and desirably from about 30 to about 45 weight percent and [wherein at least half of the vinyl acetate is converted to the alcohol.] Such a terpolymer is commercially available under the name of EVAL ®, specifically the EP series, and is manufactured by EVAL Corporation of America. EVAL is generally a random copolymer and has the general chemical formula as follows:

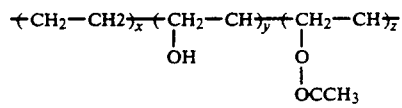

wherein the value of x is such that the weight of the ethylene repeat groups are, as noted, generally 50 percent by weight or less of the terpolymer and the value of y plus z is such that the weight of the vinyl alcohol and the vinyl acetate repeat units is generally at least 50 percent of the terpolymer, and often from about 55 percent to about 70 percent by weight. The Tg of the ethylene-vinyl acetate-vinyl alcohol terpolymer is generally below about 65° C., desirably less than about 60° C., and preferably less than about 57° C., as from about 50° C. to about 57° C.

The following table portrays various polymer properties for several EVAL resins.

TABLE 1

| POLYMER PROPERTIES | | | | |
|---|---|---|---|---|
| | EP-F101 | EP-H101 | EP-K102 | EP-E105 |
| Melt Index, g/10 min. | 1.3 | 1.6 | 2.9 | 5.5 |
| Density, g/cc | 1.19 | 1.17 | 1.17 | 1.14 |
| Melting Point, °C. | 181 | 175 | 175 | 164 |
| Crystallization Temperature, °C. | 161 | 151 | 151 | 142 |
| Glass Transition Point, °C. | 69 | 62 | 62 | 55 |
| Vicat Softening Point, °C. | 173 | 165 | 159 | 155 |
| Heat Distortion Temperature, °C. | 100 | 90 | 90 | 80 |
| Ethylene Content, Mol % | 32 | 38 | 38 | 44 |

The preferred EVAL resin is EP-E105. The amount of terpolymer is generally from about 10 to about 40 weight percent, desirably from about 15 to about 30 weight percent, and preferably from about 18 to about 25 weight percent based upon the total weight of the blend, that is, the terpolymer, the syndiotactic 1,2-polybutadiene, and the compatibilizing agent. The thermoplastic terpolymer generally has a higher melting point than the elastomer, and a higher viscosity. The melting point is generally from about 160° C. to about 185° C. The terpolymer has unique properties not found in copolymers of ethylene-vinyl acetate. Some important physical properties include good barrier resistance, and high crystallinity.

In comparison, ethylene vinyl acetate (EVA) polymers are not satisfactory barriers to air and hence would not provide the necessary properties for the present invention. EVA generally melts in the range of about 103° C. to about 108° C. and, thus, does not have a higher melting point than the matrix elastomer. As stated above, it is important to the present invention that the barrier terpolymer have a higher melting point than the matrix polymer. The formation of a laminar structure depends on establishing a melted heterogeneous blend of incompatible polymers so that when the melt is stretched, orientated, one polymer is in the form of a discontinuous phase. To achieve the structure necessary for forming platlets, it is necessary for the barrier polymer to be the lesser component and to generally have a higher melting point and melt viscosity than the matrix polymer.

The blend composition desirably contains an ingredient that functions as a compatibilizing agent in order to achieve improved permeability resistance. These compatibilizing agents typically contain from 3 to 12 carbon atoms and are usually unsaturated carboxylic acids, anhydrides, or esters thereof; or polymers containing these groups. Specific examples include maleic acid, methacrylic acid, acrylic acid, ethacrylic acid, fumaric acid, phthalic acid, maleic anhydride, phthalic anhydride, glycidol methacrylate, diethyl maleate, itaconic acid, and the like. The amount of compatibilizing agent varies, but generally is from about 0.2 percent by weight to about 3 percent by weight, and preferably an amount of from about 1 to about 2 percent by weight based upon 100 parts by weight of the elastomer barrier composition blend, that is, the terpolymer, the syndiotactic containing polybutadiene, and the compatibilizing agent.

A desirable aspect of forming the morphology-controlled barrier elastomer of the present invention involves the mixing of the melt blend. The mixing procedure desirably is such that a laminar morphology of a thermoplastic component is formed so that even lower permeability values are obtained. The unexpected low permeability values obtained by this invention can generally be attributed to these laminar morphologies. In order to achieve the improved barrier properties, the two polymers must be immiscible, i.e., the syndiotactic polybutadiene and the terpolymer should have two different Tg's and form a melted, heterogeneous blend. A desired laminar morphology is achieved when the terpolymer exists in an elongated or flat-like configuration as a separate phase within the melt blend and desirably in substantially parallel (i.e., plus or minus 30° or plus or minus 15°) orientations or configurations. The length to height ratio of the plate-like terpolymer structures, as an average of the total platelike structures, is generally at least 5, desirably at least 10, more desirably at least 20, and preferably at least 50 with an upper limit being about 200 and even about 500. The elongation or stretching can be accomplished by several means such as compression molding, blow molding, extrusion, calendering, or the like. Such elongations have been found to yield the above length to height ratio of the platelike structures.

The mixing device utilized to form the elongated plate-like separate terpolymer phase can be a low shear extruder, a mill, or the like. The two polymers must be mixed together to form a heterogeneous blend of the barrier material being distributed in the continuous matrix of the elastomer. This is best accomplished by using a low shear process such as an extruder with a low compression screw generally used for metering with low shear rates generally in the range of about 10 to 80 reciprocal seconds, and preferably about 20 to 50 reciprocal seconds. High shear extruders or a Banbury mixer will intensively mix the blend, homogenize the blend and will not result in platlets or elongated zones of the barrier polymer and the composition will not have suitable permeability for an effective inner liner. The mixing temperature is generally such that the syndiotactic 1,2-polybutadiene melts along with the terpolymer to form a heterogenous blend. Such a melting temperature is generally from about 120° to about 210° C. and preferably from about 165° to about 195° C. During the course of mixing, care must be taken that adequate shear is utilized so as to produce a blend having the above-noted plate-like structures, and overmixing is avoided so that a dispersion or lack of plate-like structures is produced.

The controlled morphology barrier elastomer blends of the present invention can be utilized in various elastomers wherein improved impermeability to air and other gases is desired, such as in rubber components and goods. A particular end use is within the innerliners of tires, and also in hoses, bladders, containers, and the like. Due to the high amounts of syndiotactic polybutadiene utilized, the barrier compositions have good flexibility.

Tire innerliners are generally comprised of any conventional elastomer including those known to the art and to the literature, such as for example butyl rubber which is a copolymer of isoprene and a small amount, for example less than 10 percent by weight, of isobutylene. Halobutyl rubber made from chlorobutyl or bromobutyl rubbers are particularly desirable. Moreover, various butyl rubbers can be blended with natural rubber to form a suitable tire innerliner material. The polyisobutylene portion of the butyl molecular provides a low degree of permeability to gases, hence leads to the use of butyl rubber in tire innerliners.

The invention will be better understood by reference to the following examples.

EXAMPLE I (Control)

Syn 1,2-PBD, amount of vinyl approximately 83 percent, was provided as a light yellow powder, and passed through an 80-mesh screen prior to use. Ethylenevinyl alcohol-vinyl acetate copolymer EP E-105 purchased from EVAL Company of America with a melting point of 164° C. was added. The polymers were hand-mixed and vacuum-dried. Melt blending was done using a Haake Model 40 Banbury mixer at 185° C. with a rotor speed of 50 rpm for a 5-minute mixing cycle. The shear rate was maintained at about 100 sec-1. These blends were intensively mixed. Various compositions were prepared as summarized in Tables I and II varying in range from 90 percent syn 1,2-PBD/EVAL to 10 percent syn 1,2-PBD/EVAL.

The following tables summarize the physical properties.

TABLE I

CONTROL BLEND PROPERTIES
NO COMPATIBILIZING AGENT

| SAMPLE | TENSILE (psi) | ELONG. (%) | TEAR (ppi) | PERMEABILITY (units*) |
|---|---|---|---|---|
| 100 SYN | 3150 | 420 | 714 | 471 |
| 90 S/10 E | 3500 | 391 | 588 | 572 |
| 80 S/20 E | 2776 | 338 | 516 | 662 |
| 70 S/30 E | 1807 | 185 | 404 | 647 |
| 50 S/50 E | 395 | 2 | 235 | 402 |
| 30 S/70 E | 783 | 2 | 490 | 32 |
| 10 S/90 E | 1095 | 2 | 618 | 1 |
| 100 EVAL | 8437 | 5 | 1814 | 0.7 |

TABLE II

DSC THERMAL TRANSITIONS
NO COMPATIBILIZING AGENT

| SAMPLE | Tm (°C.) | Tc (°C.) |
|---|---|---|
| 100 SYN | 136 | 98 |
| 90 SYN/10 EVAL | 133, 166 | 109, 139 |
| 80 SYN/20 EVAL | Broad, 165 | 109, 140 |
| 70 SYN/30 EVAL | Broad, 166 | 110, 141 |
| 50 SYN/50 EVAL | None, 168 | 107, 140 |
| 30 SYN/70 EVAL | None, 166 | 107, 140 |
| 10 SYN/90 EVAL | None, 166 | None, 141 |
| 100 EVAL | None, 168 | None, 141 |

EXAMPLE 2

Additional blends were prepared by adding 1.5 percent maleic anhydride to the composition of Example 1. The maleic anhydride was mixed in situ with the syn 1,2-PBD/EVAL. After mixing, the blends were compression molded into 6×6×0.15 inch films. These blends were intensively mixed as in Example 1. The shear rate was maintained at about 100 sec-1, using a Banbury mixer.

The following tables summarize the results.

TABLE III

BLEND PROPERTIES
1.5% MALEIC ANHYDRIDE

| SAMPLE | TENSILE (psi) | ELONG. (%) | TEAR (ppi) | PERMEABILITY (units*) |
|---|---|---|---|---|
| 100 Syn | 3150 | 420 | 714 | 471 |
| 80 S/20 E | 3180 | 216 | 621 | 356 |
| 70 S/30 E | 2814 | 12 | 495 | 280 |
| 50 S/50 E | 3803 | 6 | 626 | 83 |
| 30 S/70 E | 5328 | 4 | 712 | 49 |
| 20 S/80 E | 4930 | 2 | 684 | 33 |
| 10 S/90 E | 7378 | 3 | 1102 | 20 |

*Permeability units are cc/mil 100 sq. in./24 hrs. at 30° C.
NEED TO DISCUSS THE IMPROVED RESULTS.

TABLE IV

DSC THERMAL TRANSITIONS
1.5% MALEIC ANHYDRIDE

| SAMPLE | Tm (C.) | Tc (C.) |
|---|---|---|
| 80 SYN/20 EVAL | 137 | 106 |
| 70 SYN/30 EVAL | 152 | 106 |
| 50 SYN/50 EVAL | 158 | 106, 122 |
| 30 SYN/70 EVAL | 154 | 107, 123 |
| 20 SYN/80 EVAL | 163 | 106, 129 |
| 10 SYN/90 EVAL | 163 | None, 131 |

As apparent from Table III, even though intensively mixed, reductions with regard to permeability improvement are achieved utilizing small amounts of a compatibilizing agent in comparison with Table I. Moreover, improved tear strengths and higher tensile strengths were obtained utilizing the compatibilizing agent.

EXAMPLE 3

An intensively mixed 80/20 EVAL blend was prepared as in Example 2 including the compatibilizing agent. The laminar EVAL blends were formed by extruding the mixture at a melt temperature of approximately 185° C., through a Haake low compression (laminar) screw with L/D of 25:1. The shear rate was maintained at about 30 reciprocal seconds. The blends were then extruded through a 4-inch film die producing a film of approximately 60 to 80 mils thick and 3 to 3½ inches wide. The film was then elongated to double its original size by pressing at approximately 165° C. between two platlets. The physical properties of the comparative blends along with the permeability are shown in Table V.

TABLE V

PROPERTIES OF EVAL BLENDS

| SAMPLE RATIO | TENSILE (psi) | ELONG. % | 50% MOD (psi) | TEAR (ppi) | PERM (cc/mil) |
|---|---|---|---|---|---|
| Laminar 85/15 | 3347 | 271 | 2271 | 733 | 232 |
| Laminar 80/20 | 2425 | 151 | 2101 | 690 | 85 |
| Intensive 80/20 | 3180 | 216 | 2206 | 621 | 356 |

As apparent from Table V, a dramatic reduction in the permeability level was achieved by obtaining a laminar morphology, that is, a plate-like structure of the terpolymer in accordance with the present invention.

While in accordance with the Patent Statutes, the best mode and preferred embodiment has been set forth, the scope of the invention is not limited thereto, but rather by the scope of the attached claims.

What is claimed is:

1. An innerliner of a tire containing a barrier composition, comprising;
a blend of syndiotactic 1,2-structure containing polybutadiene, a saponified copolymer of ethylene, vinyl acetate, and vinyl alcohol, and a compatibilizing agent, wherein said compatibilizing agent is one or more unsaturated acids, esters, anhydrides or derivatives thereof, or polymers containing unsaturated acids, esters, anhydrides or derivatives thereof, wherein the amount of said syndiotactic microstructure in said polybutadiene is at least 80 percent by weight based upon the total weight of syndiotactic, atactic, and isotactic structure of said polybutadiene, wherein the amount of said terpolymer is form about 10 to about 40 percent by weight, wherein the amount of said compatibilizing agent is from about 0.2 to about 3 percent by weight, and wherein the amount of said polybutadiene is the difference, all based upon the total weight of said polybutadiene, said terpolymer, and said compatibilizing agent.

2. An innerliner of a tire containing a composition according to claim 1, wherein the vinyl content of said polybutadiene is from about 82 to about 96 percent.

3. An innerliner of a tire containing a composition according to claim 2, wherein the amount of said syndiotactic microstructure is at least 85 percent by weight, wherein said copolymer has a Tg of 65° C. or less, wherein said copolymer contains 50 percent by weight or less of ethylene repeat units, and wherein said compatibilizing agent is an anhydride, or a dicarboxylic acid, or an ester thereof, having a total of from 4 to 12 carbon atoms, or a polymer thereof.

4. An innerliner of a tire containing a composition according to claim 3, wherein the vinyl content of said polybutadiene is from about 82 to about 92 percent by weight, wherein said copolymer has a Tg of 60° C. or less, and wherein the amount of said copolymer is from about 15 to about 30 percent by weight.

5. An innerliner of a tire containing a composition according to claim 4, wherein said copolymer contains from about 30 to about 45 percent by weight of ethylene repeat units, and wherein said compatibilizing agent is maleic anhydride, maleic acid, fumaric acid, methacrylic acid, acrylic acid, itaconic acid, phthalic acid, phthalic anhydride, maleic anhydride, glycidol methacrylate, diethyl maleate, or combinations thereof.

6. An innerliner of a tire containing a composition according to claim 5, wherein said syndiotactic content of said polybutadiene is at least 90 percent by weight, wherein said copolymer has a Tg of from about 50 to about 57° C., wherein the amount of said copolymer is from about 18 to about 25 percent by weight, wherein the amount of said compatibilizing agent is from about 1 to about 2 percent by weight and wherein the amount of said syndiotactic containing polybutadiene is the difference.

7. An innerliner of a tire containing a composition according to claim 1, wherein said copolymer exists as a separate phase within said blend and has an elongated plate-like structure wherein the length to height ratio of said structure is an average of generally at least 5.

8. An innerliner of a tire containing a composition according to claim 2, wherein said copolymer exists as a separate phase within said blend and has an elongated plate-like structure wherein the length to height ratio of said structure is an average of generally at least 10.

9. An innerliner of a tire containing a composition according to claim 8, wherein said copolymer exists as a separate phase within said blend and has an elongated plate-like structure wherein the length to height ratio of said structure is an average of generally at least 20.

10. An innerliner of a tire containing a composition according to claim 6, wherein said copolymer exists as a separate phase within said blend and has an elongated plate-like structure wherein the length to height ratio of said structure is an average of generally at least 20.

* * * * *